United States Patent [19]

Peting

[11] Patent Number: 4,552,385
[45] Date of Patent: Nov. 12, 1985

[54] BOLTLESS RESTRAINED PIPE JOINT

[75] Inventor: Robert G. Peting, Oak Forest, Ill.

[73] Assignee: AMSTED Industries Incorporated, Chicago, Ill.

[21] Appl. No.: 455,037

[22] Filed: Jan. 3, 1983

[51] Int. Cl.4 .............................................. F16L 17/02
[52] U.S. Cl. .................... 285/111; 285/231; 285/321; 285/374
[58] Field of Search ................. 285/374, 231, 321, 111

[56] References Cited

U.S. PATENT DOCUMENTS

| 1,261,254 | 4/1918 | McWane | 285/374 |
| 3,222,091 | 12/1965 | Marshall | 285/321 |
| 3,698,744 | 10/1972 | Bevington | 285/111 |
| 4,456,288 | 6/1984 | Conner | 285/374 |

FOREIGN PATENT DOCUMENTS

| 1095601 | 12/1960 | Fed. Rep. of Germany | 285/231 |
| 2718208 | 11/1977 | Fed. Rep. of Germany | 285/374 |

Primary Examiner—Cornelius J. Husar
Assistant Examiner—Eric Kennon Nicholson
Attorney, Agent, or Firm—Charles E. Bouton; Edward J. Brosius

[57] ABSTRACT

A boltless restrained pipe joint having means for accommodating axial misalignment of a spigot in a bell mouth and having snap ring means disposed in a restraining assembly for holding the spigot and bell mouth against axial separation.

6 Claims, 2 Drawing Figures

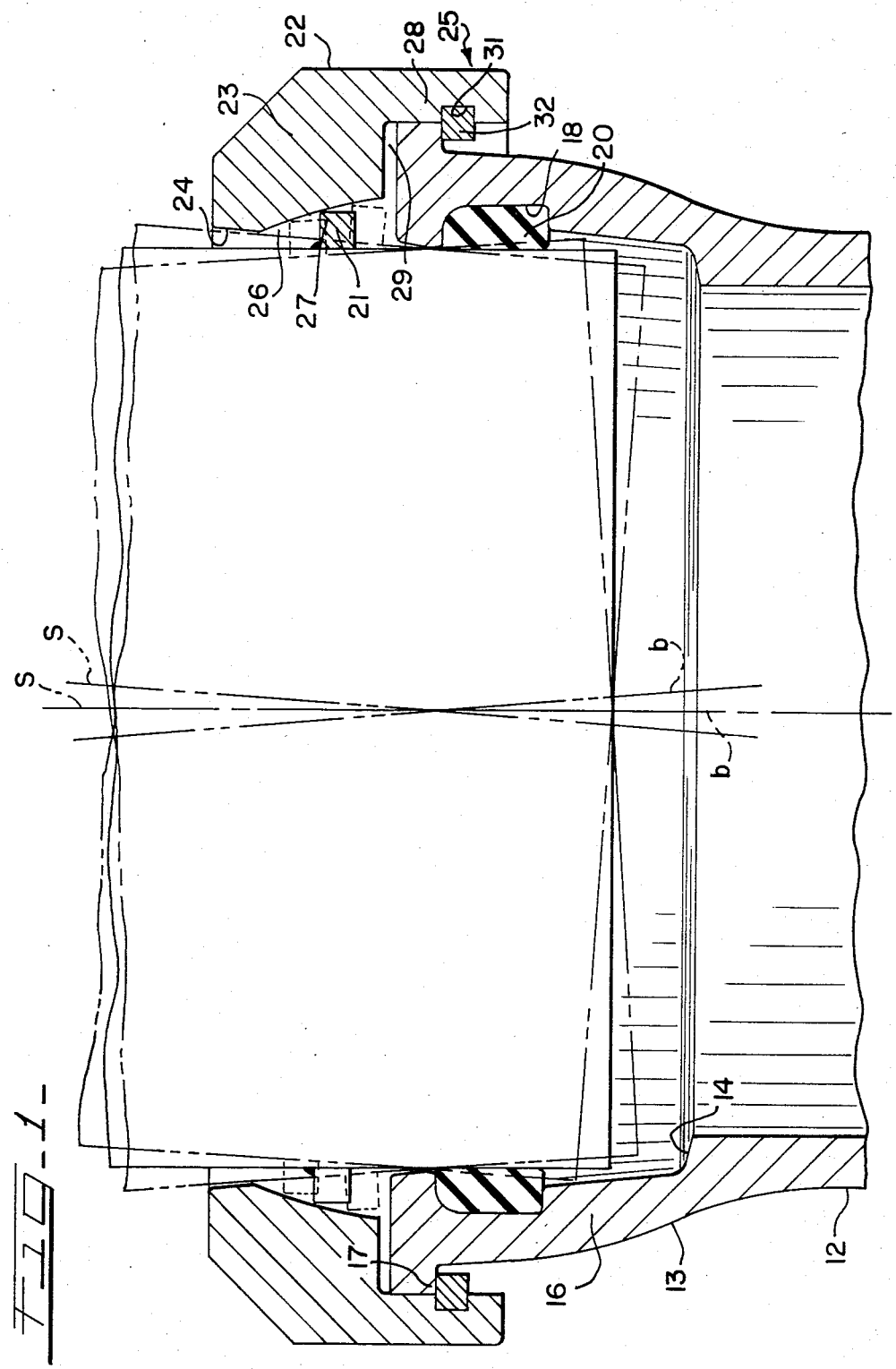

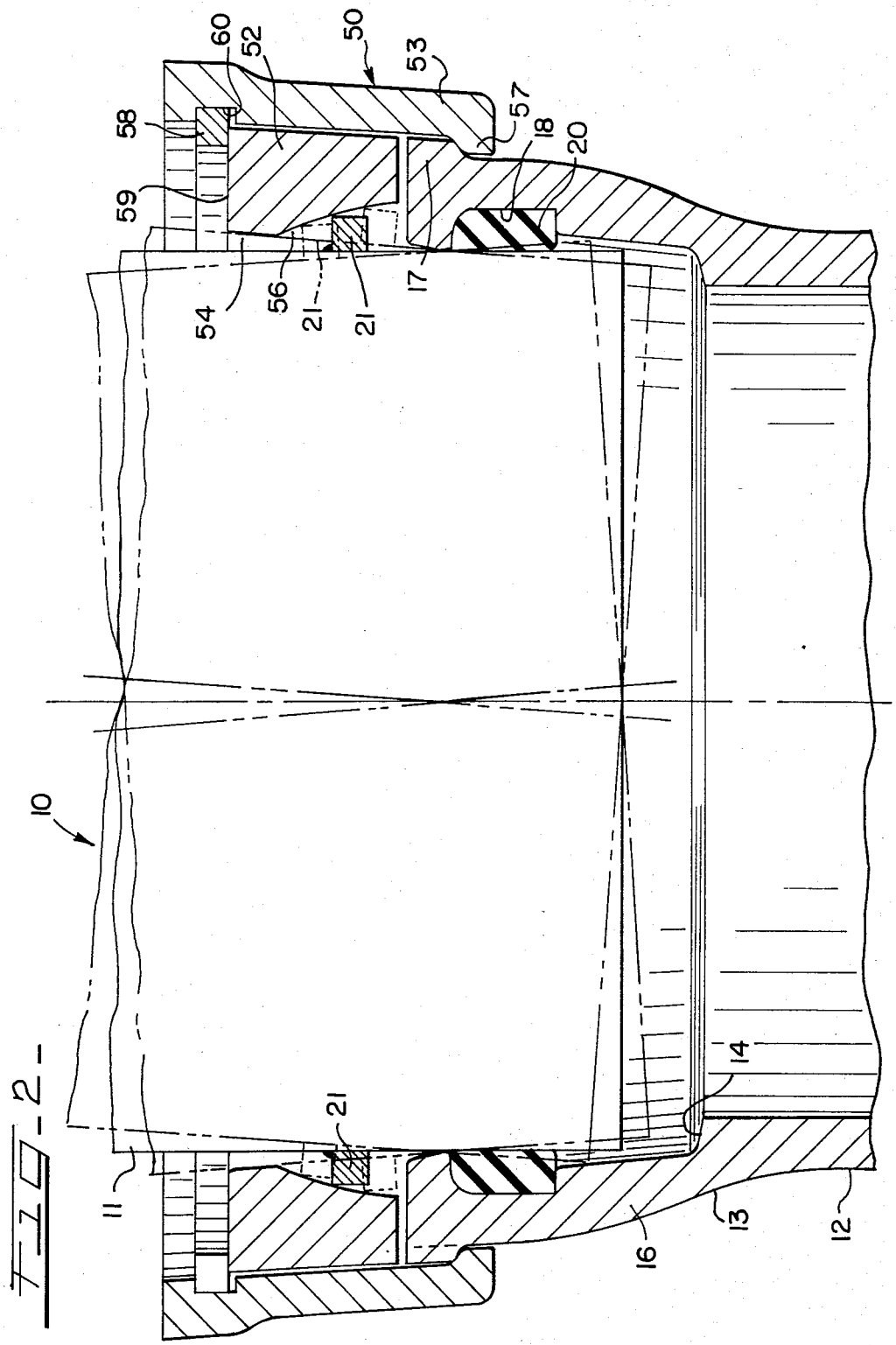

BOLTLESS RESTRAINED PIPE JOINT

FIELD OF THE INVENTION

The present invention relates to joints for bell and spigot type couplings such as commonly used for pipes and fittings and more particularly to an improved boltless restrained mechanical joint.

BACKGROUND OF THE INVENTION

"Locked" or "boltless" joints for restraining a pair of adjoining pipe lengths are known in the art.

One such type of joint comprises a spigot on one end of a pipe or fitting inserted into a bell mouth of another adjoining pipe or fitting and held fixed by lead or the like. This type of joint is generally rigid and does not permit or provide for angular deflection of the pipe lengths as caused by ground shifts or loads imposed thereon.

A further type of joint utilizes an annular resilient gasket disposed about the spigot. The gasket is held in compression between the spigot and bell mouth surfaces. The spigot and bell mouth are held locked against lengthwise axial displacement by metal clips molded into the sealing gasket and coacting upon being bent with grooves in the spigot to restrain separation of the pipe sections.

Another type of locked joint is a ball and socket joint. The spigot is deformed into a convex cylindrical surface which seats with a complementary concave surface in the bell mouth. An annular locking collar is provided on the spigot for locking engagement with the bell mouth.

A still further locked pipe joint is shown in U.S. Pat. No. 3,698,744 wherein an annular locking collar is disposed about the spigot and coacts with a bell mouth restraining flange to prevent axial separation of the pipe sections. The locking collar is mounted on the spigot to permit limited axial misalignment of the spigot and bell mouth longitudinal axis.

SUMMARY OF THE INVENTION

By the present invention it is proposed to provide an improved boltless type of pipe joint which permits limited longitudinal axial misalignment of the spigot and bell mouths while at the same time providing a lock preventing lengthwise axial separation of the joint.

This is accomplished by providing a pipe joint including a spigot and a bell mouth with a ring fixed to the spigot at a location remote from the terminal end and a restraining assembly coacting with the fixed ring to restrain the spigot and bell mouth from axial separation. A compressible sealing gasket is disposed about the spigot and is seated in the bell mouth.

The restrainer assembly comprises an inner collar or retainer ring slidably disposed over the spigot and having a concave surface which engages the spigot ring. The retainer ring is held fixed relative to the spigot ring by a snap ring which seats in a groove formed in the collar so that a flange projecting from the assembly underlies the lip about the bell mouth. The provision of the concave surface accommodates limited axial misalignment of the spigot and bell mouth.

In another form of the invention the restraining assembly comprises a retainer ring and concentric outer sleeve disposed about the spigot. The inner surface of the retainer ring is provided with a concave surface which engages the spigot ring fastened to the spigot as described above. The outer sleeve includes a projecting annular flange having an inwardly directed lip which is adapted to underly the outwardly projecting circumferential flange on the bell mouth. A snap ring is seatable in a groove and overlies the retainer ring to force the concave surface into engagement with spigot ring and to hold the lip in firm engagement with the underside of bell mouth flange so that the spigot and bell mouth are restrained against longitudinal separation. At the same time the concave surface accommodates longitudinal misalignment of the spigot and bell mouth.

BRIEF DESCRIPTION OF THE DRAWINGS

FIG. 1 is a cross-sectional view of one embodiment of the pipe joints of the present invention showing the maximum misaligned position of the pipe joint in phantom lines.

FIG. 2 is another embodiment of the pipe joint showing the maximum misaligned position of the pipe joint in phantom.

DESCRIPTION OF THE PREFERRED EMBODIMENT

Referring now to the drawings, there is shown a joint 10 including a spigot 11 and a bell mouth 13 receiving the spigot 11. As shown, the bell mouth 13 is generally bell shaped and includes a lower annular ledge 14 from which there projects a bell housing 16 terminating at its free end in an annular laterally projecting lip 17. The interior wall of housing 16 is provided with an annular groove 18 which is adapted to receive a gasket 20.

The gasket 20 is made from a resilient compressible material such as rubber and/or synthetic material. The gasket 20 is placed in the annular groove 18 so that when the spigot 11 is inserted into the bell mouth the gasket 20 is compressed within the annular groove 18 to provide a seal.

Fixed to the spigot 11 as by welding or the like is an annular ring 21. The annular ring 21 is of generally rectangular cross section and serves as a stop for a retainer sleeve or ring 22 of a restrainer assembly 25 as shown in FIG. 1.

The retainer ring 22 includes an annular body 23 of which the inner wall 24 is a diameter slightly larger than the outer diameter of the spigot thereby to permit limited rocking of the retainer ring relative to the spigot as more fully to be explained below.

Extending from the inner wall 24 is an arcuate concave surface 26 which engages the upper outer corner portion 27 of the spigot ring 21. Preferably the concave surface 26 is generally spheroidal.

An annular skirt 28 extends integrally from the body along the outer wall of the retainer sleeve 22 and provides a socket 29 which accommodates the lip 17 of the bell mouth 13 therein. Seated within a groove 31 of the skirt is a snap ring 32.

The snap ring 32 as shown underlies the lip 17 and serves to maintain the arcuate surface 26 in firm engagement with the spigot ring 21. In this manner the spigot 11 and bell socket pipe 12 are restrained against longitudinal or lengthwise separation.

In the event that the longitudinal axes of the spigot 11 and the bell mouth 13 are misaligned as shown in the phantom lines, the spigot ring 21 remains in engagement with spherical surface 26 so that spigot and bell mouth are restrained against lengthwise separation. The spherical surface 26 is formed so as to accommodate about a maximum of 5% misalignment between the spigot and bell mouth axes S and b.

FIG. 2 illustrates another embodiment of restraining assembly 50 for holding the spigot and bell mouth against lengthwise separation. Like reference characters are used to identify like elements in the embodiment of FIG. 1.

The joint comprises a spigot 11 inserted into the bell mouth opening as heretofore described with a gasket 20 disposed about the spigot 11 and seated in a groove 18. The gasket 20 provides a seal between the outer surface of the spigot 11 and the bell mouth 13.

A restraining assembly 50 serves to hold the spigot 11 and bell mouth 13 from separating. As shown the assembly 50 includes a retainer ring 52 and a ring sleeve 53. The restraining assembly is provided with an inner annular wall 54 of somewhat larger diameter than the outer diameter of the spigot 11 so as to permit limited rocking movement of the ring 52 relative to the spigot 11 as more fully to be explained hereinafter. Extending from the inner wall 54 is an arcuate, preferably spherical surface 56 which engages the upper outer corner of the ring 21 fixed to the spigot 11.

The retainer sleeve 53 is coaxially disposed about the retainer ring 52 and includes an inwardly directed ledge 57 on one end. The ledge is adapted to underlie the lip 17 on the bell mouth 13 as shown. Seated in a peripheral groove 60 provided on the inner wall of the sleeve 53 is a snap ring 58. The section view of FIG. 2 is further taken at a position showing an unconnected end of the snap ring 58 (to the left side as seen in the drawing). The snap ring 58 overlies the retaining ring 52 and engages the exposed surface 59 of the retaining ring 52 thereof so as to hold the concave or spherical surface 56 in firm engagement with the ring 21 and the ledge 57 in underlying engagement with the lip 17. In this manner the spigot 11 and bell mouth are held locked against axial separation.

Should the spigot 11 and bell socket pipe 12 be out of axial alignment as shown in phantom line (FIG. 2) the ring 21 continues to bear against the arcuate surface or wall 56. At the same time the snap ring 58 overlying the retaining ring 52 is also operative to retain the ledge 57 of the sleeve 53 in firm engagement beneath the lip 17 so that the spigot and bell mouth are restrained against axial separation.

What is claimed is:

1. A restrained pipe joint comprising,
a bell mouth including an annular lip,
a spigot inserted into said bell mouth,
a compressible sealing gasket disposed about said spigot end and seated within a groove in said bell mouth,
a ring fixed to said spigot,
annular restraining ring means disposed about said spigot and having a concave inner wall engagable with said spigot ring,
said restraining ring means including first holding means engaging said restraining ring for holding said concave surface in engagement with said spigot ring and second holding means underlying said lip on said bell mouth thereby to restrain said spigot and bell mouth against lengthwise separation, at least one of said first or second means comprising a snap ring.

2. The invention as defined in claim 1 wherein said restraining ring means is formed with a groove adjacent said second holding means and said snap ring is seated in said groove.

3. The invention as defined in claim 1 wherein said concave inner wall comprises a spherical wall.

4. The invention as defined in claim 1 wherein said restraining ring means comprises an inner restraining ring and an outer sleeve having said second means formed thereon,
and said snap ring is seated in grooves provided in said outer sleeve, said snap ring engaging said inner restraining ring to maintain said concave surface in engagement with said spigot ring and maintain said second holding means in underlying relationship with said lip.

5. The invention as defined in claim 4 wherein said arcuate inner wall comprises a spherical wall.

6. A restrained pipe joint comprising,
a bell mouth including an annular lip,
a spigot inserted into said bell mouth,
a compressible sealing gasket disposed about said spigot end and seated within a groove in said bell mouth,
a ring fixed to said spigot,
annular restraining ring means disposed about said spigot and having a concave inner wall engageable with said spigot ring said annular restraining ring means having a face that closely parallels a longitudinally exposed face of said annular lip,
said restraining ring means including first holding means engaging said restraining ring for holding said concave surface in engagement with said spigot ring and second holding means underlying said lip on said bell mouth thereby to restrain said spigot and bell mouth against lengthwise separation, at least one of said first or second means comprising a snap ring having two unconnected ends whereby the diameter of said snap ring conforms to its confinement.

* * * * *